Patented Feb. 21, 1939

2,147,629

UNITED STATES PATENT OFFICE 2,147,629

COATED MATERIAL AND METHOD OF PRODUCING SAME

William Hale Charch, Buffalo, N. Y., assignor, by mesne assignments, to E. I. du Pont de Nemours & Company, Wilmington, Del., a corporation of Delaware No Drawing. Application June 17, 1930, Serial No. 461,840

24 Claims. (Cl. 91—68)

This invention relates to coated materials and to the method of producing the same. Specifically, it relates to sheets or films of regenerated cellulose coated or otherwise treated to successfully resist the passage, penetration or diffusion of moisture or water vapor without destroying or impairing the transparency and flexibility of said sheets, and to the method of producing the same, as well as the composition for coating said sheets or films.

This application is a division-in-part of my copending application Serial No. 328,047, filed on December 22, 1928.

Sheets or films of regenerated cellulose, by virtue of their transparency and flexibility, have attained extensive and widespread use as wrapping tissues. When so used regenerated cellulose sheeting produces a package which, in addition to being extremely attractive, clearly displays the article or material wrapped. Regenerated cellulose sheeting, however, has one serious disadvantage, namely, it is not moistureproof. In other words, it does not successfully resist the passage, penetration or diffusion of moisture or water vapor therethrough to a substantial degree for a substantial period of time. Hence, when foodstuffs containing moisture in the original fresh state are wrapped in regenerated cellulose sheeting and exposed to the atmosphere, said moisture will diffuse or otherwise pass through the wrapper, and as a result, the product, at the time it reaches the consumer, will not be in its natural fresh condition. On the other hand, when a crisp or substantially moisture-free material is wrapped in regenerated cellulose sheeting, these properties will not be maintained upon exposure to the atmosphere or to some other environment containing moisture. The moisture will penetrate or otherwise pass through the wrapper and destroy the aforesaid desired characteristics.

The trade is very anxious for a material which may be successfully used as a wrapping tissue and which is capable of withstanding the passage, penetration or diffusion of water vapor or moisture therethrough to a substantial degree for a substantial period of time without sacrificing or impairing the desirable characteristics of transparency and flexibility. A wrapping material having these desirable characteristics as well as freedom from tackiness has already been devised, and it consists of regenerated cellulose sheeting combined with a moistureproof composition consisting in one of its modifications of a thin coating comprising a cellulose derivative, a gum or resin, waxes and a plasticizer.

I have now found that I can produce a material having the desired characteristics of moistureproofness, flexibility, non-tackiness and transparency by combining, impregnating, coating, spraying or otherwise treating any suitable base, including regenerated cellulose sheeting, with a composition comprising a natural or synthetic resin or mixtures thereof and one or more moistureproofing waxes or wax-like substances with or without suitable plasticizers, softeners or materials having softening effects.

It is therefore an object of this invention to provide a moistureproof and non-tacky material comprising a base of any suitable material coated on one or both sides with a composition comprising essentially a resin, such as a natural gum and/or a synthetic resin, and one or more moistureproofing waxes or wax-like substances with or without suitable plasticizers.

Another object of this invention is to provide a flexibile, transparent, non-tacky and moistureproof material capable of use as a wrapping material and successfully resisting the passage, penetration or diffusion of moisture or water vapor therethrough to a substantial degree for a substantial period of time comprising regenerated cellulose sheeting coated with a composition comprising a resin, such as a natural gum, preferably a synthetic resin, and a wax or wax-like substance with or without a plasticizer.

Another object of this invention is to provide a method of producing moistureproof materials.

A further object of this invention is to provide a composition capable of forming a transparent, flexible, non-tacky film and capable of being used to treat various materials to produce a product which successfully and effectively resists the passage, penetration or diffusion of water vapor or moisture therethrough to a substantial degree for a substantial period of time.

A still further object of this invention is to provide a composition which in addition to effectively moistureproofing a base serves also, in the case of various opaque and translucent materials, to render transparent and/or considerably enhance the transparency thereof.

Other objects will appear from the following description and appended claims.

In accordance with this invention, various materials are treated, as hereafter more clearly explained, with a composition comprising one or more resins, such as natural gums and/or synthetic resins, in admixture with one or more moistureproofing waxes or waxy substances with or without plasticizers.

To prepare the composition I use one or more resins which are capable of solution in organic solvents and may be deposited therefrom in transparent films. I also use resins which are completely soluble in or at least show a definite tolerance in solution toward dilution with hydrocarbon solvents, such as benzene, toluene, gasoline and the like, or non-hydrocarbon solvents, such as ether, carbon tetrachloride and isopropyl ether, which will dissolve the wax or waxy substance. Resins completely insoluble, unattacked or not gelatinized by solvents or solvent mixtures composed in whole or in part by hydrocarbons, will in general be found unsatisfactory for the present purposes, since such resins are not compatible with wax or waxy substances.

It is desirable to use a resin showing, in addition to the above-mentioned properties, a certain inherent toughness. In the art synthetic resins are known to differ widely as regards the chemical constituents entering into their formation. Such resins may be obtained in a variety of forms depending on their method of manufacture and varying from more or less thick viscous liquids on the one extreme to extremely hard and somewhat brittle and fragile bodies on the other. Neither of these extremes will be in general found useful in the present invention, but I prefer a type of resin which is usually intermediate in properties so that it will show less brittleness and a more inherent toughness. Resins possessing great flexibility have also been produced. For instance, I have seen resins formed in slabs of one-quarter inch thicknesses bent or slowly dented with the finger nail or a sharp instrument. These resins are useful here as well as slightly harder or tougher resins than would be revealed by this simple test. Thus, moderate hardness, toughness, transparency, freedom from tack and a certain tolerance in and out of solutions toward hydrocarbons constitute the criteria for the selection of the resin.

Resins suitable for the present purpose may be chosen from classes widely divergent as regards the raw materials entering into their composition. For instance, resins prepared from vinyl derivatives, including styrene, vinyl acetate, vinyl chloride, vinyl chloracetate and interpolymers of vinyl chloride and vinyl acetate, serve very well as a base material with which to admix waxes or waxy substances in the production of the composition.

I may also use modified alkyd (polyhydric alcohol-polybasic acid) resins, that is, alkyd resins formed by the reaction of one or more polyhydric alcohols, one or more polybasic acids, and one or more modifying agents, such as natural or synthetic drying oils, semi-drying oils and non-drying oils, natural or synthetic resins, and monobasic acids, including drying oil acids, semi-drying oil acids, non-drying oil acids and natural or synthetic resin acids. Synthetic resins of this type have a tolerance toward hydrocarbon solvents and may be produced sufficiently tough and capable of blending with waxes and wax-like materials to make them useful in coating compositions for use in the manner set forth herein.

Natural resins or gums, mixtures of natural resins or gums and synthetic resins, or a plurality of resins may also be successfully used in accordance with the principles of this invention.

Since the methods of preparing the above-mentioned synthetic resins or the resins per se do not constitute any part of this invention (except as combined with various other materials in the production of the coating composition), description thereof is deemed unnecessary here.

For the moistureproof wax or waxy material, I prefer to use paraffin, since it is common and readily available. The high melting point of refined wax affords better resistance to moisture and thus is somewhat better suited for my purpose than the lower melting variety. However, it is to be understood that this invention is not limited to the specific wax hereinbefore mentioned, since it is obvious that many other moistureproofing waxes, waxy or wax-like substances, both hard and soft, and including Japan wax, spermaceti, ceresin wax, beeswax, petroleum jelly, may be used alone or in combination with one another or other moistureproofing waxes and/or waxy and/or wax-like substances to obtain different properties. If desired, these substances may be purified by crystallization or any other means in order to obtain better blending with the resin than would be the case with the unpurified wax or waxy material. The term "waxy" employed in the claims is intended to cover waxes or waxy substances.

For the softener or plasticizer, I prefer to use such a material as tricresyl phosphate, castor oil, dibutyl phthalate or other well-known high boiling material and prefer to use a relatively odorless or completely odorless body in order that the finished product may be free from odor when applied or used with foodstuffs. Different plasticizers may be used depending on the different resins employed or mixtures of plasticizers may be employed. In certain cases where a high degree of flexibility is not required, the plasticizer may be entirely dispensed with and omitted. In such cases the above resin will be found sufficient in itself to yield the flexibility required. Some resins will require more or less plasticizer than others, and in general, the amount of plasticizer depends upon the properties desired in the finished product and the properties of the resin employed in the composition.

The relative quantities or proportions of the resin, wax or waxy substance and plasticizer may be varied to cover a wide range without departing from the principles here disclosed. Usually, the quantity of resin employed will exceed the quantity of either wax or waxy substance or plasticizer alone, and also usually the sum of the weights of the wax or waxy substance and plasticizer will be less than the total weight of resin.

The quantity or weight of wax or waxy substance taken with reference to the weight of resin need not necessarily be large to produce films having the desired properties, although in certain cases there will be no objection to increasing the quantity of wax or waxy substance over and above that actually necessary to produce the desirable properties in combination with the resins. Usually, the weight of wax or waxy substance corresponding to less than one-third the weight of resin employed will be found sufficient to produce the results desired, but under certain conditions, larger quantities may be found capable and desirable of use. The quantity of wax or waxy substance used should be sufficiently low so that the films will not exhibit a greasy surface which is not desirable. By proper balance of the ingredients, it is possible to use sufficient wax or waxy substance to obtain good moistureproof properties yet insufficient to cause a greasy surface.

The quantity of plasticizer or softener may vary from none at all to as high as 50% or more of the weight of the resin under certain conditions, although generally satisfactory results will be obtained without having to exceed the above figure. The plasticizer will frequently be found advantageous in helping the wax to blend with the resin to produce transparent coatings, where often its omission would result in hazy sheets or in semi-transparency. It will also assist in causing the coatings to adhere directly to the sheet coated. Hence, the preferred composition will include a plasticizer, although excessively large quantities thereof are to be avoided on account of the possibility of causing sticky surfaces.

The particular solvents that may be used are preferably ring or straight chain hydrocarbons, either alone or in combination with alcohol, esters, ethers or mixed ester and ether solvents. It is desirable to choose a solvent or solvent mixture not only capable of dissolving the resin but also the wax and/or waxy substance as well. For instance, toluene serves very satisfactorily in the case of the vinyl, the modified polyhydric alcohol-polybasic acid and the diphenyl resins.

To produce one modification of the composition, the solid ingredients (the plasticizers are included in this designation) may be dissolved in the desired solvent to any desired concentration of total solids. Usually, the concentration of solids will be between 10% and 40%, and particularly between 15% and 25% of the total solution. If desired, the individual solid components of the composition may be separately and individually dissolved and the resultant solutions combined to form the final composition.

As an alternative form, the composition may be prepared and used without the aid of solvents. In this event the ingredients constituting the composition are melted together to form a molten mass with which the base is coated, impregnated and otherwise treated as hereafter more fully explained.

The composition, either at ordinary or elevated temperature, may be applied to one or both sides of the base in any well-known manner, such as by immersing the base therein, coating, spraying or otherwise flowing it onto the base. After removing the excess, the coated base is dried preferably at a temperature exceeding ordinary atmospheric temperature and specifically at a temperature equal to or above the melting point of the wax. This drying is rather important to prevent the separation of the wax or waxy material from the resin. It is furthermore desirable, since the evaporation of solvents at elevated temperature is very rapid, thus permitting great economy in operation and usually improving the film. The dry coated material may be subsequently subjected to a humidification treatment and it will result in preserving the flexibility of the underlying sheet particularly when regenerated cellulose sheeting is used as the base.

In order to more clearly explain the invention, the following specific compositions and manipulative steps are set forth:

Example I

Resin: Parts by weight
Polymerization product resulting from 60% vinyl chloride and 40% vinyl acetate____ 15
Tricresyl phosphate_____ 7
Refined paraffin_____ 3

Dissolve (in any suitable manner) the above ingredients in 100 to 200 parts of toluene and immerse regenerated cellulose sheeting therein. After removing the excess coating, dry with heat and humidify.

Example II

Resin: Parts by weight
Same as in Example I_____ 15
Tricresyl phosphate_____ 3
Paraffin_____ 1

Application same as in Example I.

Example III

Resin: Parts by weight
Modified polyhydric alcohol-polybasic resin prepared from
  glycerin (14.6 parts)
  Phthalicanhydride (20.69 parts)                    } 15
  Rosin (33 parts)
  China-wood oil acid (31 parts)
Refined paraffin_____ 1
Castor oil_____ 1.5

Application same as in Example I.

Example IV

Resin: Parts by weight
Same as in Example III_____ 15
Gum dammar_____ 5
Paraffin_____ 2
Castor oil_____ 2

Application same as in Example I.

Example V

Resin: Parts by weight
Polymerized meta styrene_____ 9
Paraffin_____ ½
Tricresyl phosphate_____ 4

Example VI

Parts by weight
Gum mastic_____ 5
Paraffin_____ 2
Toluene_____ 20

Application same as in Example I.

Example VII

Parts by weight
Gum mastic_____ 6
Paraffin_____ 3
Ethyl abietate_____ 2
Toluene_____ 100

Application same as in Example I.

Example VIII

Parts by weight
Gum mastic_____ 5
Bleached beeswax_____ 2
Paraffin_____ 2
Toluene_____ 50

Application same as in Example I.

In the event a colored product is desired, a coloring agent such as a pigment or a dyestuff may be included in the coating composition.

The expression "consisting essentially of" or equivalent terminology is intended to define only the film-forming ingredients (synthetic resin and waxy substance). It is to be noted that solvents, plasticizers, softeners, coloring agents, other like modifying agents, etc. are not considered film-forming ingredients and thus are not precluded by the terminology employed and may be used in the composition.

The article produced according to this invention comprises regenerated cellulose sheeting coated on one or both sides with a composition comprising a synthetic resin and a wax or wax-like substance with or without a plasticizer. The coating is thin, transparent, homogeneous, strong, tough, firmly adherent, non-tacky and flexible and does not destroy or impair the desirable characteristics of regenerated cellulose sheeting. In other words, the product is transparent, flexible and non-tacky. In addition to these desirable characteristics, the product is moistureproof. It successfully resists the penetration, diffusion and passage of moisture or water vapor therethrough to a substantial degree for a substantial period of time. Specifically, regenerated cellulose sheeting processed and produced as herein described is at least seven times or more as effective in resisting the penetration, passage or diffusion of moisture or water vapor therethrough as the uncoated material when tested in accordance with the test set forth in the Journal of Industrial and Engineering Chemistry, page 575, vol. 21, No. 6 (June 1929). It may be used to wrap moist materials or dry materials and said materials will be maintained in their original state for a substantial period of time.

Though this invention has been particularly described with reference to regenerated cellulose sheeting, it is obvious that it may be equally applicable and successful for coating opaque materials including paper, cardboard and textile fabrics or transparent or translucent and preferably non-fibrous materials, such as gelatin (hardened and/or partially hydrolyzed), films or sheets of cellulose derivatives including cellulose acetate, cellulose nitrate and cellulose ethers, and other materials wherein a product capable of withstanding moisture is desired. When transparent materials are treated, the original transparency is not impaired, destroyed, or otherwise affected. In fact, the transparency is materially enhanced. Likewise, when translucent materials are processed as herein described, they acquire a greater degree of transparency. In the treatment of opaque materials, such as for instance paper, the latter is rendered translucent and, in many instances, transparent.

Since it is obvious that various changes may be made in the specific details set forth, this invention is not restricted thereto except as set forth in the appended claims.

I claim:

1. An article of manufacture which includes a base sheet or film comprising a material of the group consisting of regenerated cellulose, cellulose ethers, cellulose ether esters, gelatine, paper and modified paper, which material is combined with a moistureproofing composition adapted to provide a strong flexible adherent film upon materials coated therewith, the said composition containing a vinyl resin substantially identical with a resin resulting from the conjoint polymerization of a vinyl halide and a vinyl ester of an aliphatic acid, and a wax compatible with the vinyl resin.

2. A coating composition containing a vinyl resin substantially identical with a resin resulting from the conjoint polymerization of a vinyl halide and a vinyl ester of an aliphatic acid, a plasticizer therefor, a wax compatible therewith, and an organic solvent for the resin, plasticizer and wax, the ingredients being present in such proportions as to produce upon evaporation of the solvent a flexible, moisture-resistant, homogeneous, non-tacky, strong, tough and firmly adherent coating or film.

3. A substantially transparent article of manufacture comprising a base formed of a transparent flexible sheet or film of a non-fibrous cellulosic material coated with a moistureproofing composition comprising a vinyl resin substantially identical with a resin produced from the conjoint polymerization of a vinyl halide and a vinyl ester of an aliphatic acid and a wax, the ingredients constituting the coating being present in proportions to produce a substantially transparent, moistureproof, flexible, strong, firmly adherent and non-tacky coating.

4. A moistureproofing composition comprising a vinyl resin substantially identical with a resin produced from the conjoint polymerization of a vinyl halide and a vinyl ester of an aliphatic acid and a wax dissolved in a solvent, the ingredients being present in proportions to produce upon evaporation of the solvent a substantially transparent, moistureproof, flexible, strong, firmly adherent and non-tacky coating.

5. An article of manufacture which includes a base sheet combined with a moistureproofing composition adapted to provide a strong, flexible, adherent film upon materials coated therewith, the said composition containing a vinyl resin substantially identical with a resin resulting from the conjoint polymerization of a vinyl halide and a vinyl ester of an aliphatic acid, and a wax compatible with the vinyl resin.

6. An article of manufacture comprising a base sheet coated with a moistureproofing composition in which the film-forming ingredients consist essentially of a synthetic resin and a moistureproofing waxy substance, said synthetic resin being selected from the class which consists of modified alkyd resins and resins prepared from vinyl derivatives, the ingredients being present in proportions to produce a flexible, moistureproof, homogeneous, non-tacky, strong, tough and firmly adherent coating.

7. An article of manufacture comprising a base sheet coated with a moistureproofing composition in which the film-forming ingredients consist essentially of a moisture-proofing waxy substance and a resin prepared from vinyl derivatives, the ingredients being present in proportions to produce a flexible, moistureproof, homogeneous, non-tacky, strong, tough and firmly adherent coating.

8. An article of manufacture comprising a base sheet coated with a moistureproofing composition in which the film-forming ingredients consist essentially of a moistureproofing waxy substance and a modified alkyd resin, the ingredients being present in proportions to produce a flexible, moistureproof, homogeneous, non-tacky, strong, tough and firmly adherent coating.

9. An article of manufacture comprising a base sheet or film formed of a non-fibrous material and coated with a moistureproofing composition in which the film-forming ingredients consist essentially of a synthetic resin and a moistureproofing waxy substance, said synthetic resin being selected from the class which consists of modified alkyd resins and resins prepared from vinyl derivatives, the ingredients being present in proportions to produce a flexible, moistureproof, homogeneous, non-tacky, strong, tough and firmly adherent coating.

10. An article of manufacture comprising a base sheet or film formed of a non-fibrous material and coated with a moistureproofing composition in which the film-forming ingredients consist essentially of a moistureproofing waxy substance and a resin prepared from vinyl derivatives, the ingredients being present in proportions to produce a flexible, moistureproof, homogeneous, non-tacky, strong, tough and firmly adherent coating.

11. An article of manufacture comprising a base sheet or film formed of a non-fibrous material and coated with a moistureproofing composition in which the film-forming ingredients consist essentially of a moistureproofing waxy substance and a modified alkyd resin, the ingredients being present in proportions to produce a flexible, moistureproof, homogeneous, non-tacky, strong, tough and firmly adherent coating.

12. An article of manufacture comprising a base sheet or film formed of a non-fibrous cellulosic material and coated with a moistureproofing composition in which the film-forming ingredients consist essentially of a synthetic resin and a moistureproofing waxy substance, said synthetic resin being selected from the class which consists of modified alkyd resins and resins prepared from vinyl derivatives, the ingredients being present in proportions to produce a flexible, moistureproof, homogeneous, non-tacky, strong, tough and firmly adherent coating.

13. An article of manufacture comprising a base sheet or film formed of a non-fibrous cellulosic material and coated with a moistureproofing composition in which the film-forming ingredients consist essentially of a moistureproofing waxy substance and a resin prepared from vinyl derivatives, the ingredients being present in proportions to produce a flexible, moistureproof, homogeneous, non-tacky, strong, tough and firmly adherent coating.

14. An article of manufacture comprising a base sheet or film formed of a non-fibrous cellulosic material and coated with a moistureproofing composition in which the film-forming ingredients consist essentially of a moistureproofing waxy substance and a modified alkyd resin, the ingredients being present in proportions to produce a flexible, moistureproof, homogeneous, non-tacky, strong, tough and firmly adherent coating.

15. An article of manufacture comprising a base sheet coated with a moistureproofing composition in which the film-forming ingredients consist essentially of a synthetic resin and a moistureproofing waxy substance, said synthetic resin being selected from the class which consists of modified alkyd resins and resins prepared from vinyl derivatives, the waxy substance being present in an amount not exceeding one-third the amount, by weight, of the resin.

16. An article of manufacture comprising a base sheet or film formed of a non-fibrous material coated with a moistureproofing composition in which the film-forming ingredients consist essentially of a synthetic resin and a moistureproofing waxy substance, said synthetic resin being selected from the class which consists of modified alkyd resins and resins prepared from vinyl derivatives, the waxy substance being present in an amount not exceeding one-third the amount, by weight, of the resin.

17. A composition for producing a moistureproof film or coating comprising a solvent in which the film-forming ingredients consisting essentially of a synthetic resin and a moistureproofing waxy substance are dissolved, said synthetic resin being selected from the class which consists of modified alkyd resins and resins prepared from vinyl derivatives, the ingredients being present in such proportions as to produce, upon evaporation of the solvent, a flexible, moistureproof, homogeneous, non-tacky, strong, tough and firmly adherent coating or film.

18. A composition for producing a moistureproof film or coating comprising a solvent in which the film-forming ingredients consisting essentially of a moistureproofing waxy substance and a resin prepared from vinyl derivatives are dissolved, the ingredients being present in such proportions as to produce, upon evaporation of the solvent, a flexible, moistureproof, homogeneous, non-tacky, strong, tough and firmly adherent coating or film.

19. A composition for producing a moistureproof film or coating comprising a solvent in which the film-forming ingredients consisting essentially of a moistureproofing waxy substance and a modified alkyd resin are dissolved, the ingredients being present in such proportions as to produce, upon evaporation of the solvent, a flexible, moistureproof, homogeneous, non-tacky, strong, tough and firmly adherent coating or film.

20. A coating composition containing a vinyl resin substantially identical with a resin resulting from the conjoint polymerization of a vinyl halide and a vinyl ester of an aliphatic acid, a wax compatible therewith, and an organic solvent for the resin and wax, the ingredients being present in such proportions as to produce, upon evaporation of the solvent, a flexible, moisture-resistant, homogeneous, non-tacky, strong, tough and firmly adherent coating or film.

21. A composition for producing a moistureproof film or coating comprising a solvent in which the film-forming ingredients consisting essentially of a synthetic resin and a moistureproofing waxy substance are dissolved, said synthetic resin being selected from the class which consists of modified alkyd resins and resins prepared from vinyl derivatives, the waxy substance being present in an amount not exceeding one-third the amount, by weight, of the resin.

22. A composition for producing a moistureproof film or coating consisting essentially of the following ingredients in approximately the following proportions dissolved in a solvent, the proportions being by weight:

Vinyl resin resulting from the conjoint polymerization of a vinyl chloride and vinyl acetate_____ 15–15
Tricresyl phosphate_____ 3– 7
Paraffin (wax)_____ 1– 3

23. A composition for producing a moistureproof film or coating consisting essentially of the following ingredients in approximately the following proportions dissolved in a solvent, the proportions being by weight:

Alkyd resin_____ 15.0
Refined paraffin_____ 1.0
Castor oil_____ 1.5 the said alkyd resin being prepared from:

Glycerin_____ 14.60
Phthalic anhydride_____ 20.69
Rosin _____ 33.00
China-wood oil acid_____ 31.00

24. A substantially transparent article of manufacture comprising a base formed of a transparent sheet or film of a non-fibrous material coated with a moistureproofing composition comprising a vinyl resin having properties substantially the same as the resin produced from the conjoint polymerization of a vinyl halide and a vinyl ester of an aliphatic acid and a wax, the ingredients constituting the coating being present in proportions to produce a substantially transparent, moistureproof, flexible, strong, firmly adherent and non-tacky coating.

WILLIAM HALE CHARCH.